(12) United States Patent
Yaguchi et al.

(10) Patent No.: US 12,175,365 B2
(45) Date of Patent: Dec. 24, 2024

(54) LEARNING APPARATUS, METHOD, AND NON-TRANSITORY COMPUTER READABLE MEDIUM

(71) Applicant: KABUSHIKI KAISHA TOSHIBA, Tokyo (JP)

(72) Inventors: Atsushi Yaguchi, Tokyo (JP); Shuhei Nitta, Tokyo (JP); Yukinobu Sakata, Kawasaki (JP); Akiyuki Tanizawa, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 895 days.

(21) Appl. No.: 17/186,924

(22) Filed: Feb. 26, 2021

(65) Prior Publication Data

US 2022/0083856 A1    Mar. 17, 2022

(30) Foreign Application Priority Data

Sep. 16, 2020    (JP) .................................. 2020-155384

(51) Int. Cl.
*G06N 3/08*        (2023.01)
*G06N 3/045*       (2023.01)

(52) U.S. Cl.
CPC .............. *G06N 3/08* (2013.01); *G06N 3/045* (2023.01)

(58) Field of Classification Search
None
See application file for complete search history.

(56) References Cited

U.S. PATENT DOCUMENTS

| 10,664,752 | B2 * | 5/2020 | Yoshiyama | ............ G06N 3/045 |
| 2019/0180176 | A1 * | 6/2019 | Yudanov | .................. G06N 3/08 |
| 2019/0370648 | A1 * | 12/2019 | Zoph | ........................ G06N 3/045 |
| 2020/0012945 | A1 * | 1/2020 | Yaguchi | .................... G06N 3/04 |
| 2020/0034702 | A1 * | 1/2020 | Fukuda | ..................... G06N 3/08 |

FOREIGN PATENT DOCUMENTS

| JP | 2019-164839 A | 9/2019 |
| JP | 2020-008993 A | 1/2020 |

* cited by examiner

*Primary Examiner* — Lut Wong
(74) *Attorney, Agent, or Firm* — Oblon, McClelland, Maier & Neustadt, L.L.P.

(57) ABSTRACT

According to one embodiment, a learning apparatus includes a setting unit, a training unit, and a display. The setting unit sets one or more second training conditions based on a first training condition relating to a first trained model. The training unit trains one or more neural networks in accordance with the one or more second training conditions and generates one or more second trained models which execute a task identical to a task executed by the first trained model. The display displays a graph showing an inference performance and calculation cost of each of the one or more second trained models.

18 Claims, 11 Drawing Sheets

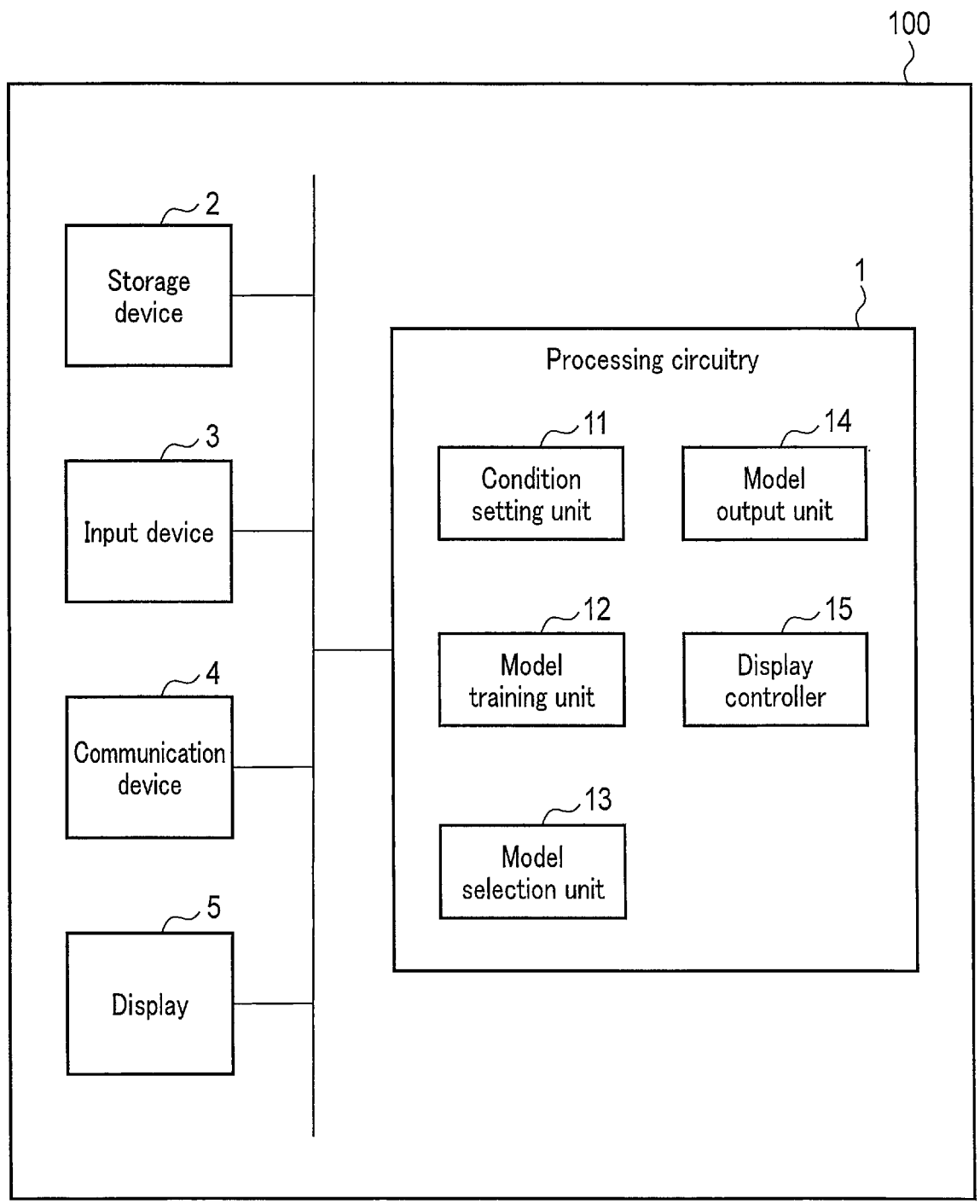
F I G. 1

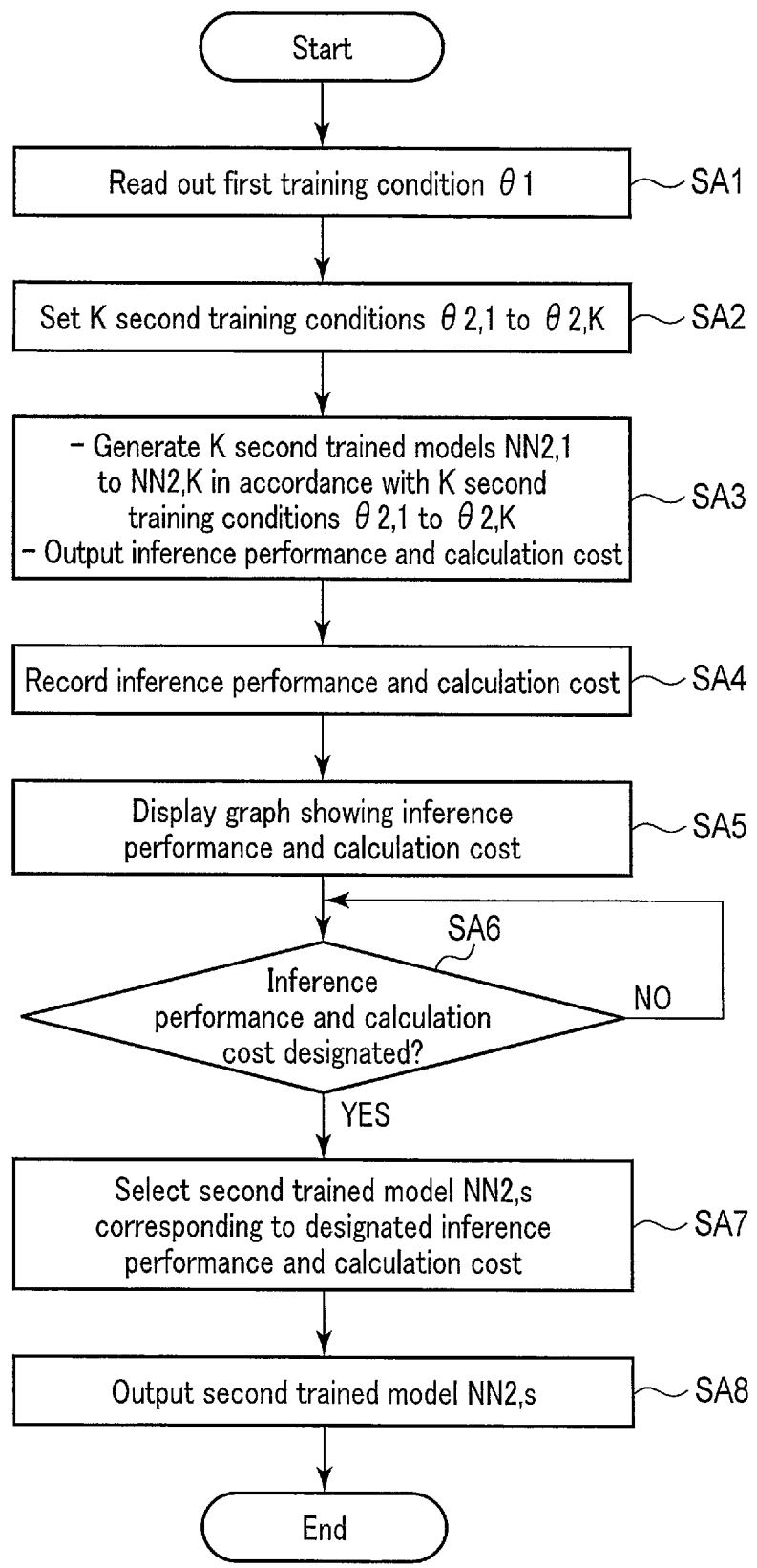
F I G. 2

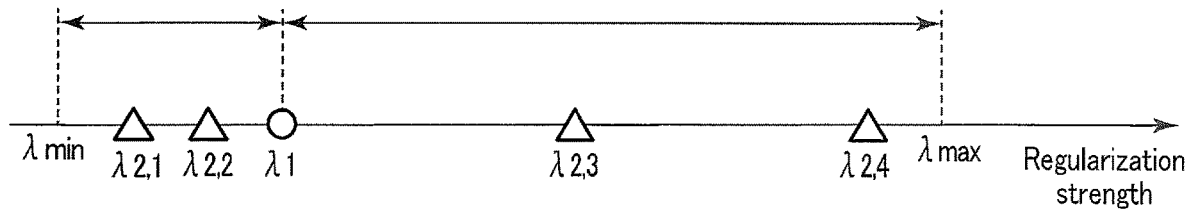
F I G. 4
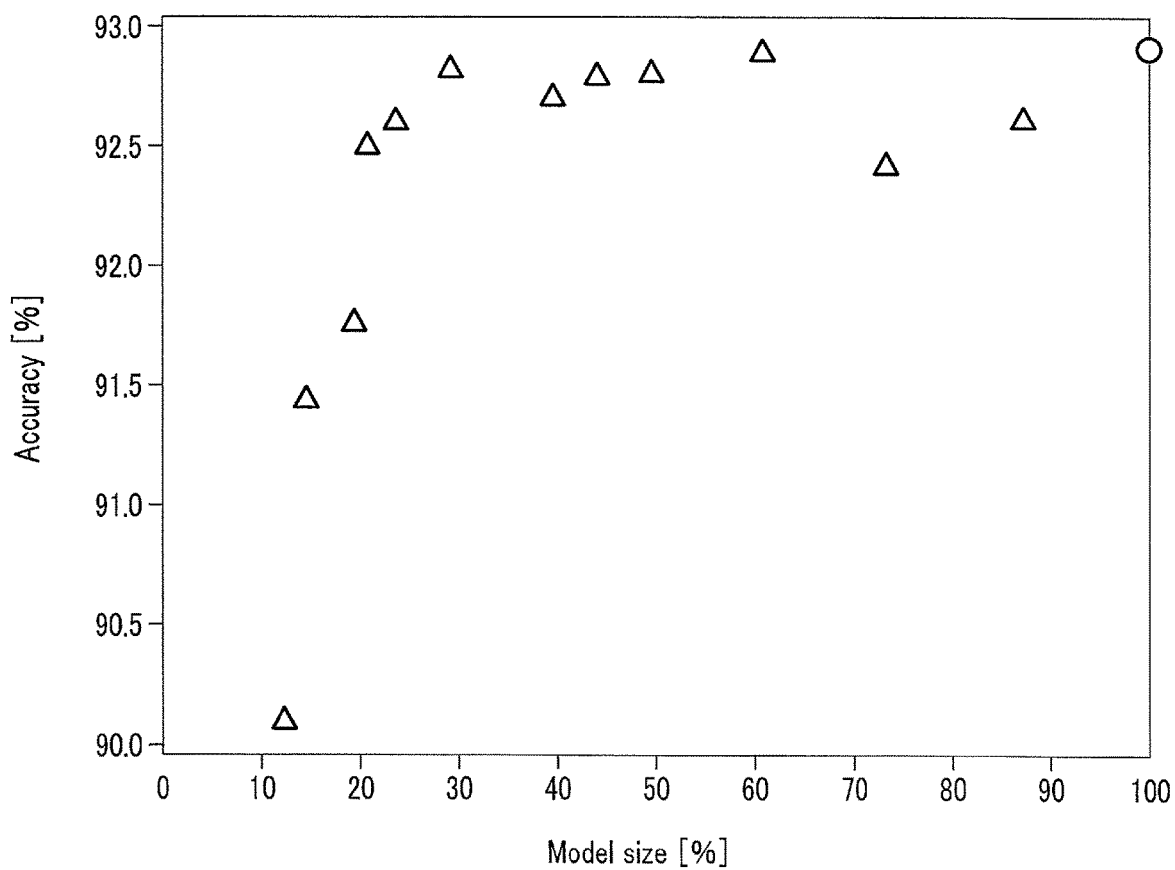
F I G. 5

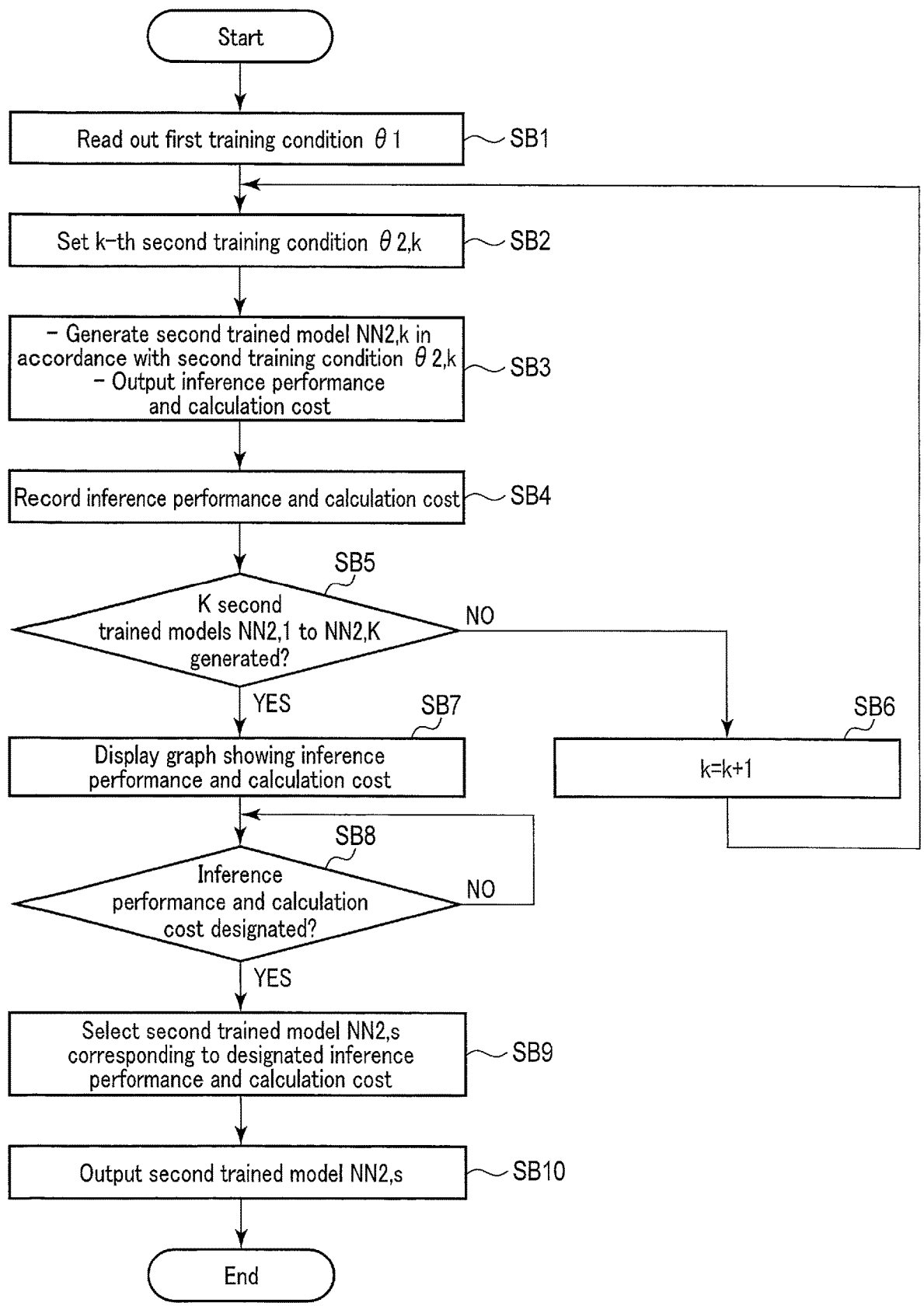
F I G. 7

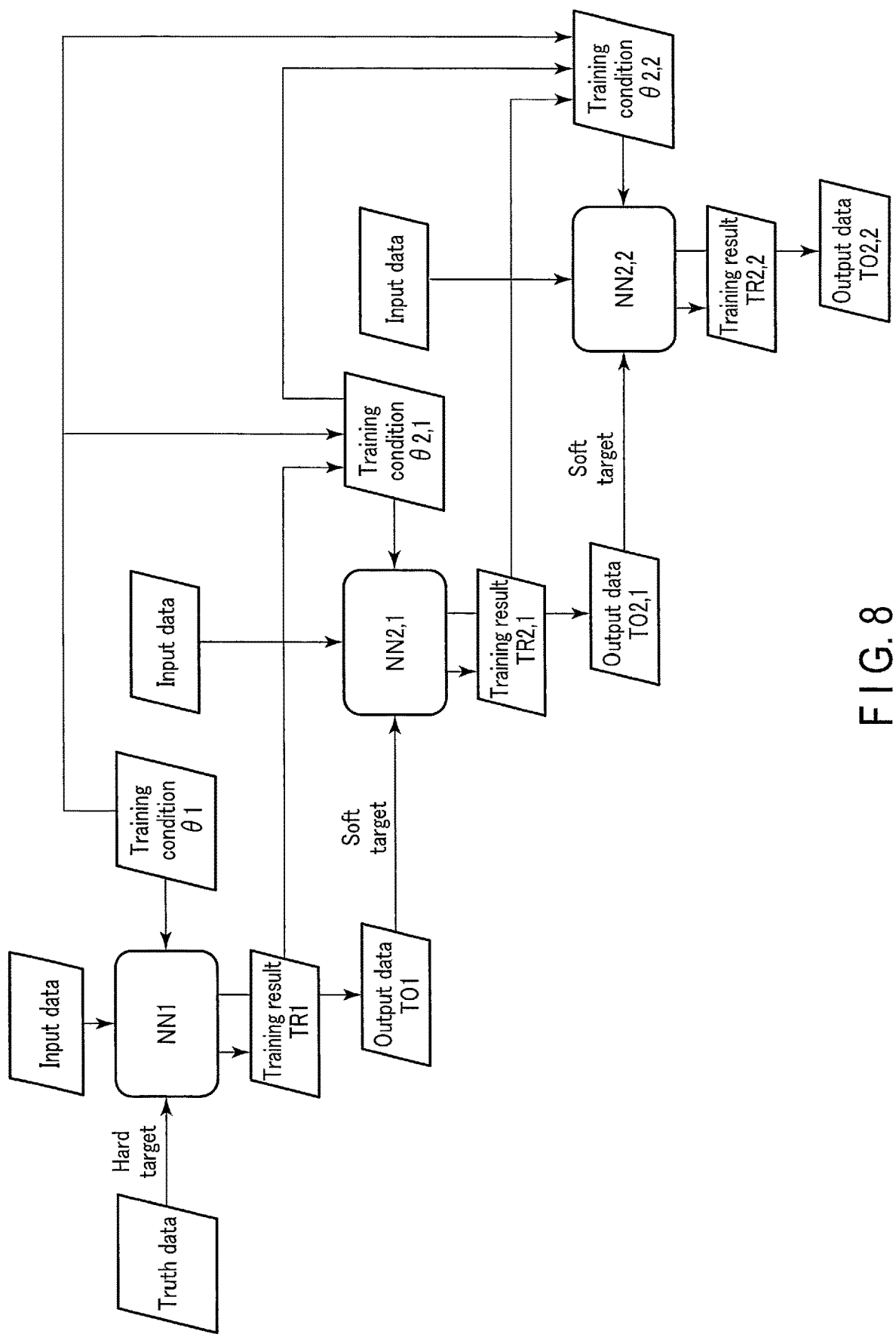
F I G. 8

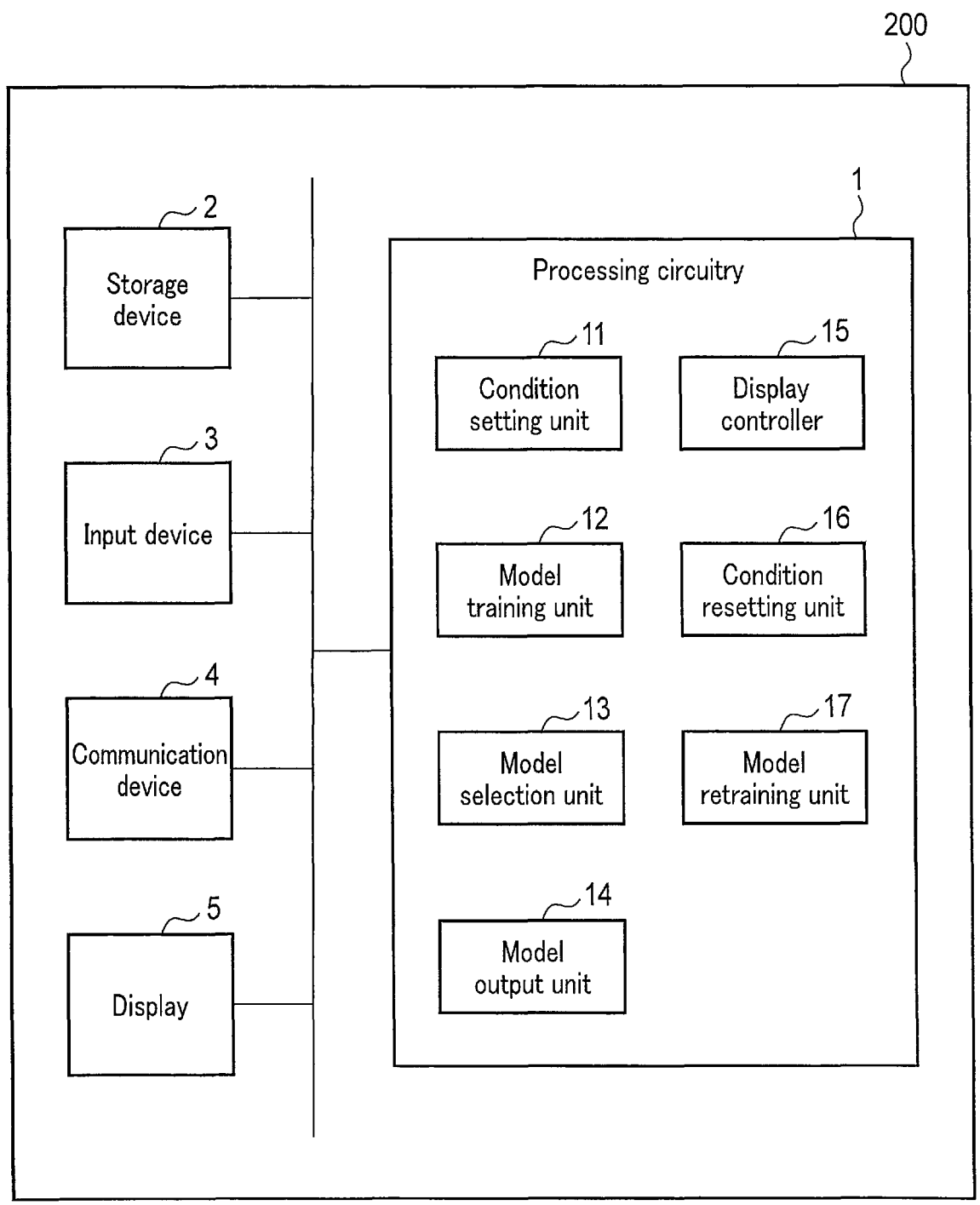
F I G. 10

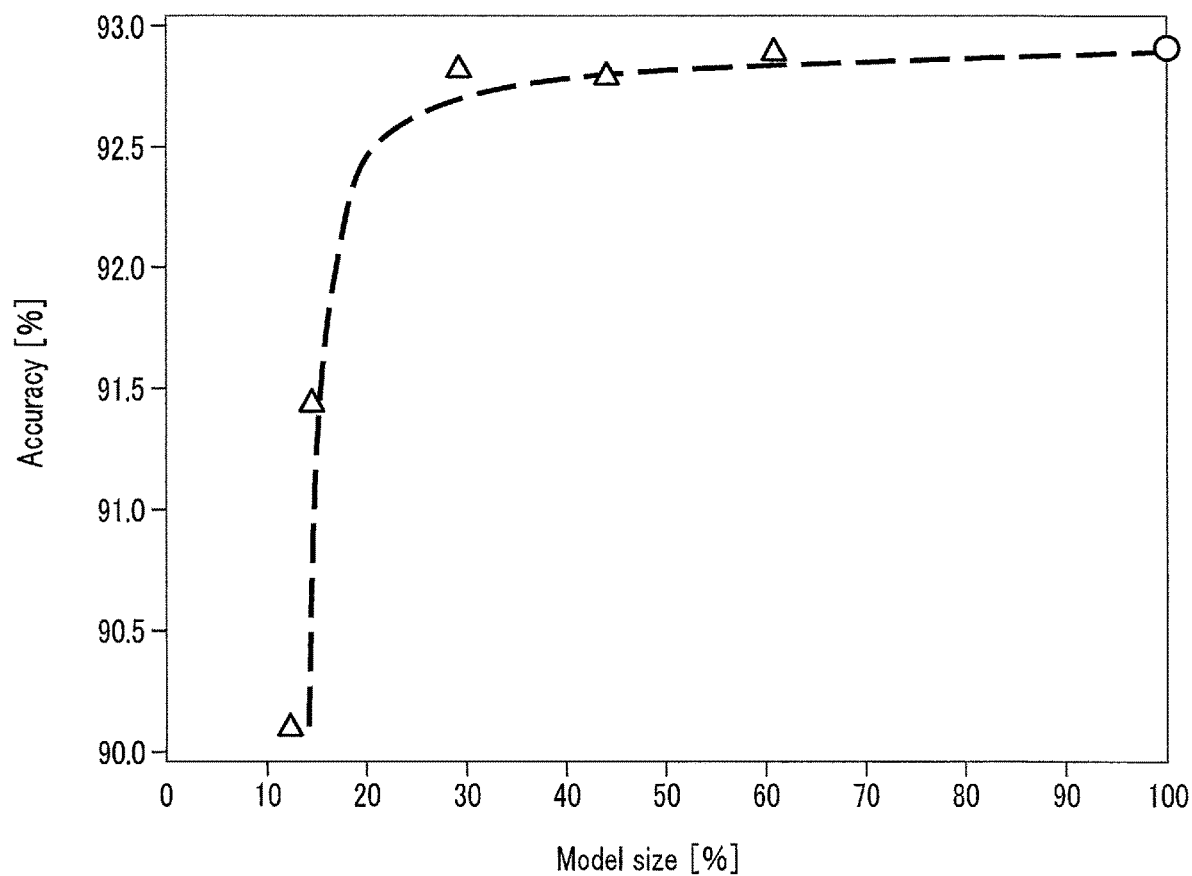
F I G. 12

LEARNING APPARATUS, METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2020-155384, filed Sep. 16, 2020, the entire contents of which are incorporated herein by reference.

FIELD

Embodiments described herein relate generally to a learning apparatus, method, and non-transitory computer readable medium.

BACKGROUND

A technique of reducing the size of a neural network while suppressing accuracy decrease is under development. However, trial and error are required to reduce the size in such a manner as to satisfy a requirement of each individual user.

BRIEF DESCRIPTION OF THE DRAWINGS

FIG. 1 shows a configuration example of a learning apparatus according to a first embodiment.

FIG. 2 shows an example of the flow of model optimization processing by processing circuitry according to a first example.

FIG. 4 shows a setting example of second regularization strengths according to the first example.

FIG. 5 shows a display example of a graph of accuracy and model size.

FIG. 7 shows an example of the flow of model optimization processing by the processing circuitry according to a second example.

FIG. 8 schematically shows a processing example of steps SB2 to SB6 of the model optimization processing according to the second example.

FIG. 10 shows a configuration example of a learning apparatus according to a second embodiment.

FIG. 12 shows a display example of an approximate curve of accuracy and model size.

DETAILED DESCRIPTION

Figure 3:
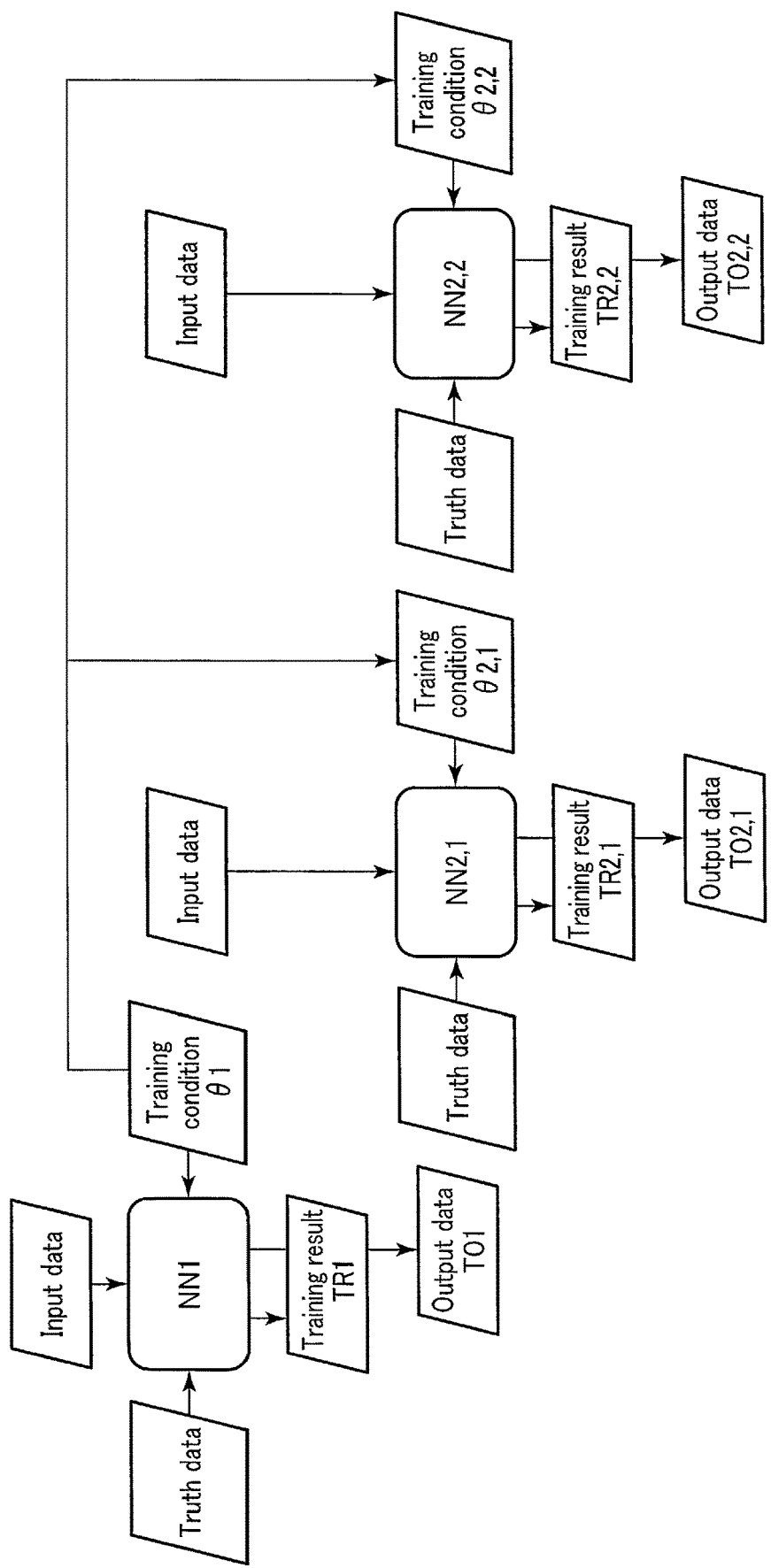
FIG. 3 schematically shows a processing example of steps SA2 and SA3 of the model optimization processing according to the first example.

In general, according to one embodiment, a learning apparatus includes a setting unit, a training unit, and a display. The setting unit sets one or more second training conditions based on a first training condition relating to a first trained model. The training unit trains one or more neural networks in accordance with the one or more second training conditions and generates one or more second trained models which execute a task identical to a task executed by the first trained model. The display displays a graph showing an inference performance and calculation cost of each of the one or more second trained models.

Hereinafter, a learning apparatus, method, and non-transitory computer readable medium according to the present embodiment will be described with reference to the accompanying drawings.

First Embodiment

FIG. 1 shows a configuration example of a learning apparatus 100 according to a first embodiment. The learning apparatus 100 is a computer that trains a neural network. As shown in FIG. 1, the learning apparatus 100 includes processing circuitry 1, a storage device 2, an input device 3, a communication device 4, and a display 5.

The processing circuitry 1 includes a processor such as a central processing unit (CPU), and a memory such as a random access memory (RAM). The processing circuitry 1 executes model optimization processing for outputting a neural network optimized for a user's requirement. The processing circuitry 1 executes a program stored in the storage device 2 to implement a condition setting unit 11, a model training unit 12, a model selection unit 13, a model output unit 14, and a display controller 15. Hardware implementation of the processing circuitry 1 is not limited to this. For example, the processing circuitry 1 may be constituted by a circuit, such as an application specific integrated circuit (ASIC), which implements the condition setting unit 11, the model training unit 12, the model selection unit 13, the model output unit 14, and/or the display controller 15. The condition setting unit 11, the model training unit 12, the model selection unit 13, the model output unit 14, and/or the display controller 15 may be implemented in a single integrated circuit, or implemented respectively in a plurality of integrated circuits.

The condition setting unit 11 sets one or more second training conditions based on a first training condition relating to a first trained model. The first training condition is a training condition for the first trained model. The first trained model is a neural network trained by any learning apparatus in accordance with the first training condition. The second training condition is a training condition for a second trained model, which differs from the first trained model.

The training condition according to the present embodiment includes a model condition, a data set condition, and a training setting condition. The model condition is a condition relating to an architecture of a neural network. For example, the model condition includes a setting condition of each layer of the neural network and a connection condition between layers. The setting condition of each layer includes, for example, conditions relating to the number of channels, an initial value of a trainable parameter (such as a weight and a bias), and a hyper-parameter. The setting condition of each layer includes a condition relating to a type of layer, such as a linear transformation layer (e.g., a convolution layer and a fully connected layer), an activation function layer (e.g., a ReLU layer, an ELU layer, and a hyperbolic tangent layer), a normalization layer (e.g., a batch normalization layer), or a pooling layer (e.g., a max pooling layer and an average pooling layer). The connection condition between layers includes a condition relating to a network architecture, such as a ResNet, a DenseNet, and a U-Net.

The data set condition includes a task type condition and a training data condition. The task type condition is a condition relating to a type of task executed by a neural network, such as image classification, detection, segmentation, speech recognition, or machine translation. The training data condition is a condition relating to contents of input data and truth (teaching) data.

The training setting condition includes, for example, a loss function condition, an optimizer condition, a regularization function condition, an initialization method condition, and a data preprocessing/expansion method condition. The loss function condition includes a type of loss function and a hyper-parameter thereof. The optimizer condition includes a type of optimizer and a hyper-parameter thereof. The type of optimizer includes, for example, gradient descent, stochastic gradient descent, AdaGrad, AdaDelta, and Adam. The regularization function condition includes a type of regularization function and a hyper-parameter thereof. The regularization function is, for example, an L1 regularization function and an L2 regularization function. The initialization method condition includes a type of initialization method and a hyper-parameter thereof. The data preprocessing/expansion condition includes a type of data preprocessing method, a hyper-parameter thereof, a type of expansion method, and a hyper-parameter thereof.

The model training unit 12 outputs a training result of a neural network. The training result includes a trained model, and an inference performance and/or calculation cost of the trained model. Specifically, the model training unit 12 trains one or more neural networks in accordance with one or more second training conditions set by the condition setting unit 11, and generates one or more second trained models which execute the same task as the first trained model. The second trained model is a neural network trained in accordance with the second training condition. The model training unit 12 outputs an inference performance and calculation cost of each second trained model. The inference performance is an index for evaluating the performance and accuracy of inference processing by each second trained model. The calculation cost is an index for evaluating the calculation cost relating to inference processing by each second trained model.

The model selection unit 13 selects a second trained model designated by a user among one or more second trained models generated by the model training unit 12. For example, the model selection unit 13 selects a second trained model having an inference performance and calculation cost corresponding to an inference performance and/or calculation cost designated by a user among one or more second trained models.

The model output unit 14 outputs the second trained model selected by the model selection unit 13.

The display controller 15 outputs various types of information to the display 5. For example, the display controller 15 causes a graph showing an inference performance and calculation cost of each of the one or more second trained models generated by the model training unit 12.

The storage device 2 is constituted by a read only memory (ROM), a hard disk drive (HDD), a solid state drive (SSD), an integrated circuit storage device, or the like. The storage device 2 stores results of various operations by the processing circuitry 1, various programs executed by the processing circuitry 1, and the like. The storage device 2 also stores, for example, the first trained model, the first training condition, the second trained model, and the second training condition.

Through the input device 3, various commands from a user are input. As the input device 3, a keyboard, a mouse, various switches, a touch pad, a touch panel display, or the like can be used. An output signal from the input device 3 is supplied to the processing circuitry 1. The input device 3 may be a computer connected to the processing circuitry 1 by wire or radio.

The communication device 4 is an interface for performing information communication with an external device connected to the learning apparatus 100 via a network.

The display 5 displays various types of information. For example, the display 5 displays a graph showing an inference performance and calculation cost of a second trained model in accordance with control by the display controller 15. As the display 5, a cathode-ray tube (CRT) display, a liquid crystal display, an organic electroluminescence (EL) display, a light-emitting diode (LED) display, a plasma display, or any other display known in the relevant technical field can be used as appropriate.

Hereinafter, the learning apparatus 100 according to the first embodiment will be described in detail.

The processing circuitry 1 according to the first embodiment executes model optimization processing and outputs a second trained model having an inference performance and/or calculation cost that satisfies a user's requirement. There are two examples of model optimization processing, differentiated by how the second training conditions are set and how the second trained models are generated. The two examples will be described below.

FIG. 2 shows an example of the flow of model optimization processing by the processing circuitry 1 according to the first example. When the model optimization processing shown in FIG. 2 starts, a first trained model has already been generated by the learning apparatus 100 or a given computer. Regarding the inference performance and calculation cost of the first trained model, typically, the user is mostly satisfied with the inference performance, but the calculation cost is so enormous that the user wishes to reduce it.

As shown in FIG. 2, the condition setting unit 11 reads out a first training condition $\theta 1$ (step SA1). For example, when a first training condition $\theta 1$, based on which model optimization processing is to be performed, is designated by a user through the input device 3, the condition setting unit 11 reads out the designated first training condition $\theta 1$ from the storage device 2.

Based on the loss function L, training data D, regularization function R, and trainable parameter set $\Theta$ included in the first training condition $\theta 1$, the objective function set forth below as expression (1) is optimized with respect to the trainable parameter set $\Theta$. A neural network is trained based on the training data D to minimize the objective function set forth as expression (1), whereby trainable parameters p of the first trained model are determined.

$$\mathcal{L}_{(D,\Theta)} + \lambda_1 \mathcal{R}_{(\theta)} \qquad (1)$$

Here, $\lambda 1$ is a positive hyper-parameter representing a regularization strength included in the first training condition $\theta 1$. As the regularization function $R(\Theta)$, for example (the square of) an L2 norm set forth below as expression (2) is used. The L2 norm is an example of the regularization function. In this case, the regularization strength $\lambda 1$ is referred to as an "L2 regularization strength". Here, $p \in \Theta$. For example, $\Theta$ includes a weight vector of each layer, p represents a weight vector of each layer, and l (1, ..., L layer) represents an index of each layer. Such a regularization function $R(\Theta)$ has the effect of suppressing overlearning.

$$\mathcal{R}_{(\Theta)} = \Sigma_l \|p^l\|_2^2 \qquad (2)$$

After step SA1, K second training conditions $\theta 2,1$ to $\theta 2,K$ are set (step SA2), and K second trained models NN2,1 to NN2,K are generated (step SA3). In step SA2, the condition setting unit 11 sets K second training conditions θ2,1 to θ2,K based on the first training condition θ1 read out in step SA1. The condition setting unit 11 may set the second training conditions θ2,1 to θ2,K by selecting them from a table in which first training conditions θ1 are registered, or may estimate the second training conditions θ2,1 to θ2,K based on the first training condition θ1. In step SA3, the model training unit 12 generates K second trained models NN2,1 to NN2,K based on the K second training conditions θ2,1 to θ2,K set in step SA2. K is an integer representing the number of second trained models, and is set at any number larger than or equal to 1. k is a number of each second trained model, and takes a value in the range of 1≤k≤K. The number K of the second trained models may be designated by a user through the input device 3 or the like, or may be automatically set. In the following description, K is larger than or equal to 2.

FIG. 3 schematically shows a processing example of steps SA2 and SA3 of the model optimization processing according to the first example. As shown in FIG. 3, in the first example, the K second training conditions θ2,1 to θ2,K are set in parallel based on the first training condition θ1, and the K second trained models NN2,1 to NN2,K are generated in parallel based on the K second training conditions θ2,1 to θ2,K. Such parallel training processing will be referred to as "parallel training processing". FIG. 3 shows the processing example of the case of K=2 for simplification of the figure.

As shown in FIG. 3, the first trained model NN1 is generated by training according to the first training condition based on training data including input data and truth data. Specifically, input data is input to an untrained neural network, and the untrained neural network performs forwardpropagation and outputs output data TO1. Next, an error between the output data TO1 and the truth data is input to the untrained neural network, and the untrained neural network performs backpropagation and calculates a gradient of a loss function regarding trainable parameters, such as weights and biases. Then, the trainable parameters of the untrained neural network are updated based on the gradient. A first trained model NN1 is generated by repeating the forwardpropagation and the backpropagation and updating the trainable parameters. In the training processing, an inference performance and calculation cost of the first trained model NN1 are output as a training result TR1.

Upon completion of the training for the first trained model NN1, as shown in FIG. 3, the condition setting unit 11 sets K training conditions θ2,1 to θ2,K corresponding respectively to K trained models NN2,1 to NN2,K in parallel based on the training condition θ1 in advance of training processing for the K trained models NN2,1 to NN2,K. The parallel training processing is performed to generate K trained models NN2,1 to NN2,K with different inference performances and/or calculation costs. The K second training conditions θ2,1 to θ2,K are set in such a manner that a specific training setting condition, which is a training condition that affects the inference performance and/or calculation cost, varies therebetween. The specific training setting condition may be any of the loss function condition, optimizer condition, regularization function, initialization method condition, and data preprocessing/expansion method condition; however, let us assume that the specific training setting condition is a regularization strength, in particular an L2 regularization strength, which is a hyperparameter of a regularization function included in the regularization function condition. The regularization strength of the second training condition may be referred to as a "second regularization strength", and that of the first training condition may be referred to as a "first regularization strength". Typically, the first trained model NN1 has a sufficient inference performance, but has a high calculation cost. Therefore, the first training condition θ1 is set to a value that prioritizes improvement in inference performance. In contrast, the second trained models NN2,1 to NN2,K are each generated as a trained model having a lower calculation cost than the first trained model NN1; therefore, the second training condition θ2 is set to a value that prioritizes improvement in calculation cost.

Based on the first regularization strength λ1 included in the first training condition, the condition setting unit 11 sets a set Λ2 of K second regularization strengths λ2,1 to λ2,K corresponding respectively to the K second training conditions θ2,1 to θ2,K.

$$\Lambda_2 = (\lambda_{2,1}, \lambda_{2,2}, \ldots \lambda_{2,K}) \quad (3)$$

FIG. 4 shows a setting example of the second regularization strengths $\lambda_{2,1}$ to $\lambda_{2,K}$ according to the first example. FIG. 4 shows, as an example, four second regularization strengths λ2,1 to λ2,4. As shown in FIG. 4, the condition setting unit 11 sets K second regularization strengths λ2,1 to λ2,K in the range of $\lambda_{min} \le \lambda 1 \le \lambda_{max}$ delimited by the lower limit value $\lambda_{min}$ and the upper limit value $\lambda_{max}$, which includes the first regularization strength λ1. The lower limit value $\lambda_{min}$ and the upper limit value $\lambda_{max}$ may be set at any value automatically or manually through the input device 3 or the like. The regularization strengths λ2,1 to λ2,K may be set at any value based on the regularization strength λ1, the lower limit value $\lambda_{min}$, and the upper limit value $\lambda_{max}$. For example, the regularization strengths λ2,1 to λ2,K smaller than the regularization strength λ1 may be set by multiplying the regularization strength λ1 by ½, ¼, ⅛, . . . , and those larger than the regularization strength λ1 may be set by multiplying the regularization strength λ1 by 2, 4, 8, . . . .

Of the second training condition θ2, the training conditions other than the second regularization strength λ2 may be set at the same values as those of the first training conditions θ1. However, they may be set at different values from those of the first training conditions θ1. For example, of the training setting conditions of the second training condition θ2, the optimizer may be set to Adam, and the activation function layer may be set to ReLU, independently of the first training condition θ1.

In step SA3, the model training unit 12 trains K neural networks in accordance with the K second training conditions θ2,1 to θ2,K set in step SA2, and generates K second trained models NN2,1 to NN2,K in parallel. Since training processing of each neural network can be independently executed, the model training unit 12 may generate K second trained models NN2,1 to NN2,K using K processors. This enables reduction in the training processing time in comparison with sequential training processing according to the second example. Specifically, the parallel training processing according to the first example can generate N trained models NN2,1 to NN2,K in a processing time required for generation of one trained model NN2,k. K processors may be processors implemented in the learning apparatus 100 as a hardware configuration, or may be other processors connected to the learning apparatus 100 by wire, radio, or network. Generation of the K second trained models NN2,1 to NN2,K may be shared by less than K processors.

As shown in FIG. 3, the model training unit 12 trains an untrained neural network based on training data including input data and truth data in accordance with the second training condition θ2,k and generates a second trained model NN2,k. The training data may be the same data as the training data used for training for the first trained model NN1, or may be different data. Hereinafter, the training processing for each second trained model NN2,k will be described in more detail.

First, as in the training processing for the first trained model NN1, the model training unit 12 repeats forward propagation and backpropagation and updates the trainable parameters, thereby generating a second trained neural network. The initial values of the trainable parameters may be set at different values from the initial values of the trainable parameters in the first training condition θ1. The initial values of the trainable parameter may be set at the same values or different values among the K second training conditions θ2,1 to θ2,K.

Next, the model training unit 12 deletes a trainable parameter having a contribution ratio below a threshold from a trained neural network. A second trained model NN2,k is thereby generated. Specifically, the model training unit 12 deletes a trainable parameter satisfying the following expression (4):

$$\|p^1\|_2^2 < \varepsilon \qquad (4)$$

More specifically, in the case of expression (4), the model training unit 12 calculates an L2 norm of a weight p which is a trainable parameter of each layer, as a contribution ratio. The predetermined threshold s may be set at a small value very close to 0, such as $1.0e^{-6}$. The model training unit 12 calculates L2 norms of weights $p^{(1)}$ of all channels, and compares each L2 norm with the threshold ε to identify a channel relating to an L2 norm below the threshold ε. The channel makes a small contribution to the operation of the neural network, and is referred to as an "inactive channel". The phenomenon in which the L2 norm of all weights set for a channel falls below a predetermined threshold and the channel makes almost no contribution to the operation is referred to as "group sparsity".

When the inactive channel is identified, the model training unit 12 deletes, from the trained neural network, the inactive channel and a trainable parameter, such as a weight and a bias, set for the inactive channel. A second trained model NN2,k is generated by deleting the inactive channel and trainable parameter.

When deleting the inactive channel and trainable parameter, the model training unit 12 may compensate for the bias set for the inactive channel. For example, the model training unit 12 deletes all weights set for the inactive channel, and combines a bias set for the inactive channel into the bias set for the channel of the subsequent layer. The model training unit 12 can thereby prevent the inference result from greatly changing in accordance with the deletion of the inactive channel.

K second trained models NN2,1 to NN2,K can be generated by performing the above training processing for all of the second training conditions θ2,1 to θ2,K. The L2 regularization strength controls the degree of closeness of a trainable parameter to 0. Trained neural networks generated in accordance with different L2 regularization strengths may have different values for weights at the same point; therefore, the number of weights to be deleted varies depending on the L2 regularization strength. By performing training processing in accordance with different L2 regularization strengths λ2,1 to λ2,K, trained models NN2,1 to NN2,K of different sizes can be generated, i.e., second trained models NN2,1 to NN2,K of different calculation costs can be generated.

In step SA3, the model training unit 12 also outputs an inference performance and calculation cost of each second trained model NN2,k. The inference performance is a recognition performance when the task of the second trained model NN2,k is recognition processing, and is a classification performance when the task is classification processing. The calculation cost is the number of trainable parameters, the number of multiplications, and/or the number of channels. Other examples of the calculation cost include an inference speed, a power consumption, a memory capacity, a memory bandwidth, and a latency. When each second trained model NN2,k is generated, the model training unit 12 calculates and outputs an inference performance and calculation cost of the second trained model NN2,k. The inference performance and calculation cost are an example of the training result TR2,k.

After step SA3, the model selection unit 13 records the inference performance and calculation cost of each second trained model NN2,k output in step SA3 (step SA4). For example, the model selection unit 13 records, in the storage device 2, each second trained model NN2,k and its inference performance and calculation cost TR2,k in association with each other.

After step SA4, the display controller 15 causes a graph showing the inference performances and calculation costs recorded in step SA4 to be displayed (step SA5). In step SA5, the display controller 15 calculates an accuracy as an index indicating an inference performance, and calculates a model size as an index indicating a calculation cost. The accuracy may be calculated by any existing method, such as cross-validation or hold-out. The model size is calculated as a ratio of the model size of the second trained model NN2,k to the model size of the first trained model NN1. With respect to each of the second trained models NN2,1 to NN2,K, the display controller 15 calculates a model size based on the number of trainable parameters, the number of multiplications, the number of channels, and/or the like of each of the first trained model NN1 and the second trained model NN2,k. The display controller 15 causes a graph of inference performance and model size to be displayed. The graph is displayed as a graphical interface for designation of an inference performance and calculation cost.

FIG. 5 shows a display example of a graph of accuracy and model size. As shown in FIG. 5, the vertical axis of the graph represents an accuracy [%], which is an example of the index of inference performance, and the horizontal axis thereof represents a model size [%], which is an example of the index of calculation cost. The graph shows data points, which are triangular in FIG. 5, each corresponding to an accuracy and model size of a second trained model. The graph shows a data point, which is circular in FIG. 5, corresponding to an accuracy and model size of a first trained model. Each data point is displayed as a graphical user interface in such a manner that it can be designated through the input device 3 or the like. Since the accuracy and model size have a trade-off relationship, the graph may also be referred to as a "trade-off curve". The graph shows that a second trained model having a small model size and a high accuracy is a preferable model. The display of the graph of inference performance and model size enables a user to easily search out a second trained model having an inference performance and calculation cost desired by the user.

After step SA5, the model selection unit 13 waits for designation of an inference performance and calculation cost in the graph displayed in step SA5 (step SA6). A user searches out an inference performance and calculation cost desired by the user by observing the graph. When the inference performance and calculation cost desired by the user are searched out, a data point corresponding to the inference performance and calculation cost is designated through the input device 3.

The display controller 15 may cause detailed information of a model size corresponding to each data point, i.e., second trained model, to be displayed. For example, the display controller 15 causes detailed information corresponding to the data point designated by the user through the input device 3 to be displayed.

Figure 6:
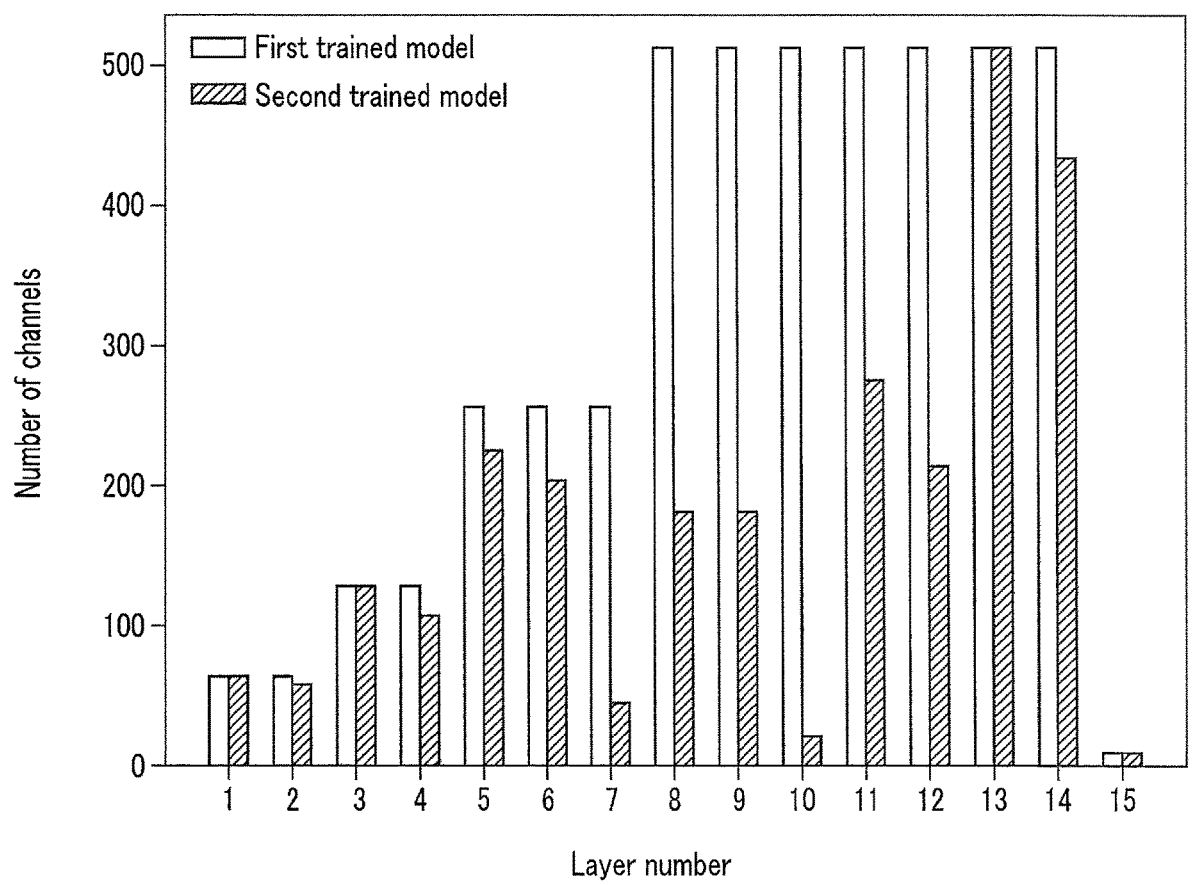
FIG. 6 shows a display example of detailed information of model sizes.

FIG. 6 shows a display example of detailed information of model sizes. As shown in FIG. 6, the detailed information is a bar chart in which the vertical axis represents the number of channels, and the horizontal axis represents a layer number. The detailed information shown in FIG. 6 shows, by a bar chart, the number of channels for each layer number, for each of the first trained model and the second trained model designated through the input device 3. The display of the detailed information enables the user to know the number of channels of which layer is reduced, and the display controller 15 can provide information based on which the user can select an inference performance and calculation cost, i.e., a second trained model.

When an inference performance and calculation cost are designated in step SAG (YES in step SAG), the model selection unit 13 selects a second trained model NN2,s corresponding to the designated inference performance and calculation cost (step SA7). s is a number of the selected second trained model, and takes a value in the range of 1≤s≤K. The inference performance and calculation cost are designated by, for example, the user clicking a data point shown in FIG. 5. In this case, the model selection unit 13 selects a second trained model NN2,s having the inference performance and calculation cost of the clicked data point. The user may click a point other than the data points in the graph shown in FIG. 5. In this case, the model selection unit 13 identifies a data point closest to the clicked point among the data points shown in the graph, and selects a second trained model NN2,s having the inference performance and calculation cost of the identified data point. The user may designate an area or line in the graph shown in FIG. 5. When the designated area or line includes one data point, the model selection unit 13 may select a second trained model NN2,s having the inference performance and calculation cost of the data point. When the designated area or line does not include any data point, the model selection unit 13 identifies a data point closest to a representative point of the area or line, and selects a second trained model NN2,s having the inference performance and calculation cost of the identified data point. The representative point may be set at any point, such as a point of the highest inference performance and calculation cost, a central point, or a barycentric point.

By selecting a second trained model NN2,s corresponding to the inference performance and calculation cost designated by the user in this manner, the model selection unit 13 can select a second trained model having an inference performance and calculation cost that match or are close to a user's requirement. Typically, the model selection unit 13 can select a second trained model NN2,s having an accuracy approximately equal to that of the first trained model NN1 and a smaller model size than that of the first trained model NN1. Hereinafter, the second trained model selected in step SA7 will also be referred to as a "compact model".

After step SA7, the model output unit 14 outputs the second trained model (compact model) NN2,s selected in step SA7 (step SA8). In step SA8, the model output unit 14 stores the compact model NN2,s in the storage device 2 or transmits the compact model NN2,s to an external computer via the communication device 4. For example, the learning apparatus 100 may be implemented in an edge computing system. In this case, the learning apparatus 100 may transmit the compact model NN2,s to a terminal device on the edge side via the communication device 4. The compact model NN2,s has a small model size while having an inference performance equivalent to that of the first trained model, and thus enables the terminal device on the edge side, which has a simple hardware configuration, to provide a high-performance inference result with a low load.

The model optimization processing according to the first example accordingly finishes.

Next, model optimization processing by the processing circuitry 1 according to the second example will be described. The model optimization processing according to the second example sequentially generates a plurality of second trained models. Hereinafter, description of the same processes as those of the first example will be omitted, and different points will be described.

FIG. 7 shows an example of the flow of model optimization processing by the processing circuitry 1 according to the second example. As shown in FIG. 7, the condition setting unit 11 reads out a first training condition (step SB1).

After step SB1, setting of K second training conditions θ2,1 to θ2,K (step SB2) and generation of K second trained models NN2,1 to NN2,K (step SB3) are each sequentially performed. Specifically, in step SB2, the condition setting unit 11 sets the first second training condition θ2,1 based on the first training condition 81 read out in step SB1. In step SB3, the model training unit 12 generates the first second trained model NN2,1 based on the first second training condition θ2,1 set in step SB2. In step SB4, the model training unit 12 records the first second trained model NN2,1 output in step SB3 and its inference performance and calculation cost. In step SB5, the condition setting unit 11 determines whether or not K second trained models NN2,1 to NN2,K have been generated. When K second trained models NN2,1 to NN2,K have not been generated (NO in step SB5), the condition setting unit 11 sets k=k+1 (step SB6), and repeats steps SB2 to SB4. The steps SB2 to SB6 are repeated until K second trained models NN2,1 to NN2,K are generated. The training processing according to the second example will be referred to as "sequential training processing".

FIG. 8 schematically shows a processing example of steps SB2 to SB6 of the model optimization processing according to the second example. As shown in FIG. 8, in the second example, the first second training condition θ2,1 is set based on the first training condition 81 and training result (inference performance and calculation cost) TR1. The k-th second training condition θ2,k (k is larger than or equal to 2) is set based on the first training condition θ1, the (k−1)-th second training condition θ2,k−1 and inference performance and calculation cost TR2,k−1. For example, the second training condition θ2,k is set in such a manner as to vary the accuracy and model size between the second trained models NN2,1 to NN2,K. The K second training conditions θ2,1 to θ2,K, which are sequentially set, are set in such a manner that a specific training setting condition, which is a training condition that affects the inference performance and/or calculation cost, varies therebetween as in the first example. Such a specific training setting condition may be any of a loss function condition, an optimizer condition, a regularization function condition, an initialization method condition, and a data preprocessing/expansion method condition as in the first example.

Figure 9:
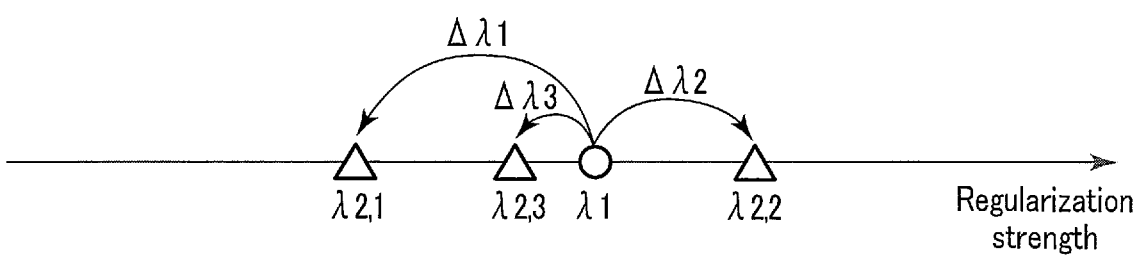
FIG. 9 shows a setting example of second regularization strengths according to the second example.

FIG. 9 shows a setting example of second regularization strengths λ2,1 to λ2,K according to the second example. FIG. 9 shows, as an example, three second regularization strengths λ2,1 to λ2,3. As shown in FIG. 9, the condition setting unit 11 sets the second regularization strength λ2,k at λ2,k=λ1+Δλk, which is a value obtained by deviating the first regularization strength λ1 upward or downward by Δλk. As described above, Δλk is set based on the inference performance and calculation cost TR1, such as an accuracy and model size, in the case of K=1, and is set based on the inference performance and calculation cost TR2,k−1 in the case of k≥2. For example, the second regularization strength θ2,k is set in such a manner to vary the inference performance and calculation cost between the second trained models NN2,1 to NN2,K. The second regularization strength θλ,k may be set within the range of $\lambda_{min} \le \lambda 1 \le \lambda_{max}$ delimited by the lower limit value $\lambda_{min}$ and the upper limit value $\lambda_{max}$, which includes the first regularization strength λ1, as in the first example. The condition setting unit 11 may set the second regularization strength λ2,k to a value obtained by deviating the preceding second regularization strength λ2,k−1 upward or downward by Δλk.

The sequential training processing sequentially sets each second training condition θ2,k based on the first training condition θ1, the preceding training condition θ2,k−1, and/ or the like, and thus can correctly set each second training condition θ2,k. Therefore, the sequential training processing can reduce the number K of second trained models to be generated in comparison with the parallel training processing.

As shown in FIG. 8, the second trained models NN2,1 to NN2,K may be generated by distillation. For example, the first second trained model is obtained by training using the output data TO1 of the first trained model NN1 as a soft target, and the k-th second trained model NN2,k (k is larger than or equal to 2) is obtained by training using the output data TO2,k−1 of the (k−1)-th second trained model NN2, k−1 as a soft target. The second trained models NN2,1 to NN2,K may be obtained by training using the output data TO1 of the first trained model NN1. Utilization of distillation can reduce the model size while further improving the inference performance of the second trained model NN2,k.

When the second trained models NN2,1 to NN2,K are sequentially generated in this manner (YES in step SB5), the display controller 15 causes a graph showing the inference performances and calculation costs recorded in step SB4 to be displayed (step SB7). After step SB7, the model selection unit 13 waits for designation of an inference performance and calculation cost in the graph displayed in step SB7 (step SB8). When an inference performance and calculation cost are designated in step SB8 (YES in step SB8), the model selection unit 13 selects a second trained model NN2,s corresponding to the designated inference performance and calculation cost (step SB9). After step SB9, the model output unit 14 outputs the second trained model (compact model) NN2,s selected in step SB9 (step SB10).

The model optimization processing according to the second example accordingly finishes.

The above embodiment may be modified in various ways. For example, regarding the inference performance and calculation cost of each second trained model, both of them may be higher or lower than those of the first trained model, or one of them may be higher or lower than that of the first trained model. In the above embodiment, an inference performance and calculation cost are described as being designated in step SA6 or SB8; however, the inference performance and calculation cost may be designated by another means such as numerical value input, or only one of the inference performance and calculation cost may be designated.

The second trained models NN2,1 to Nn2,K may be generated by distillation also in the first example. For example, the second trained models NN2,1 to NN2,K may be obtained by training using the output data TO1 of the first trained model NN1 as a soft target. Utilization of distillation can reduce the model size while further improving the inference performance of the second trained model NN2,k.

The learning apparatus 100 according to the above-described first embodiment includes at least the condition setting unit 11, the model training unit 12, and the display controller 15. The condition setting unit 11 sets one or more second training conditions based on a first training condition relating to a first trained model. The model training unit 12 trains one or more neural networks in accordance with one or more second training conditions, and generate one or more second trained models which execute the same task as the first trained model. The display controller 15 causes a graph showing an inference performance and calculation cost of each of one or more second trained models to be displayed.

The above-described configuration enables the user to easily find out a second trained model having an inference performance and calculation cost desired by the user, which is derived from the first trained model already generated, without trial and error, from a graph showing inference performances and calculation costs. Since a plurality of second trained models having a plurality of inference performances and calculation costs, which are derived from the first trained model, can be generated, second trained models each having a lower calculation cost (smaller model size) than the first trained model while having an inference performance equivalent to that of the first trained model can be obtained.

Second Embodiment

Hereinafter, a second embodiment will be described. The same structures and processes as those in the first embodiment will be assigned with the same symbols as those in the first embodiment, and redundant explanations will be omitted.

FIG. 10 shows a configuration example of a learning apparatus 200 according to a second embodiment. As shown in FIG. 10, the learning apparatus 200 includes the processing circuitry 1, the storage device 2, the input device 3, the communication device 4, and the display 5.

The processing circuitry 1 according to the second embodiment performs retraining in accordance with a second training condition selected by the model selection unit 13. The retraining enables generation of a third trained model having an improved inference performance in comparison with the second trained model.

As shown in FIG. 10, the processing circuitry 1 implements a condition resetting unit 16 and a model retraining unit 17 in addition to the condition setting unit 11, the model training unit 12, the model selection unit 13, the model output unit 14, and the display controller 15. Hardware implementation of the processing circuitry 1 is not limited to this. For example, the processing circuitry 1 may be constituted by a circuit, such as an application specific integrated circuit (ASIC), which implements the condition setting unit 11, the model training unit 12, the model selection unit 13, the model output unit 14, the display controller 15, the condition resetting unit 16, and/or the model retraining unit 17. The condition setting unit 11, the model training unit 12, the model selection unit 13, the model output unit 14, the display controller 15, the condition resetting unit 16, and/or the model retraining unit 17 may be implemented in a single integrated circuit, or implemented respectively in a plurality of integrated circuits.

The condition resetting unit 16 sets a third training condition based on the first training condition and the second training condition relating to the second trained model selected by the model selection unit 13. The third training condition is a training condition used for retraining.

The model retraining unit 17 generates a third trained model by training a neural network in accordance with the third training condition set by the condition resetting unit 16.

Hereinafter, the learning apparatus 200 according to the second embodiment will be described in detail.

Figure 11:
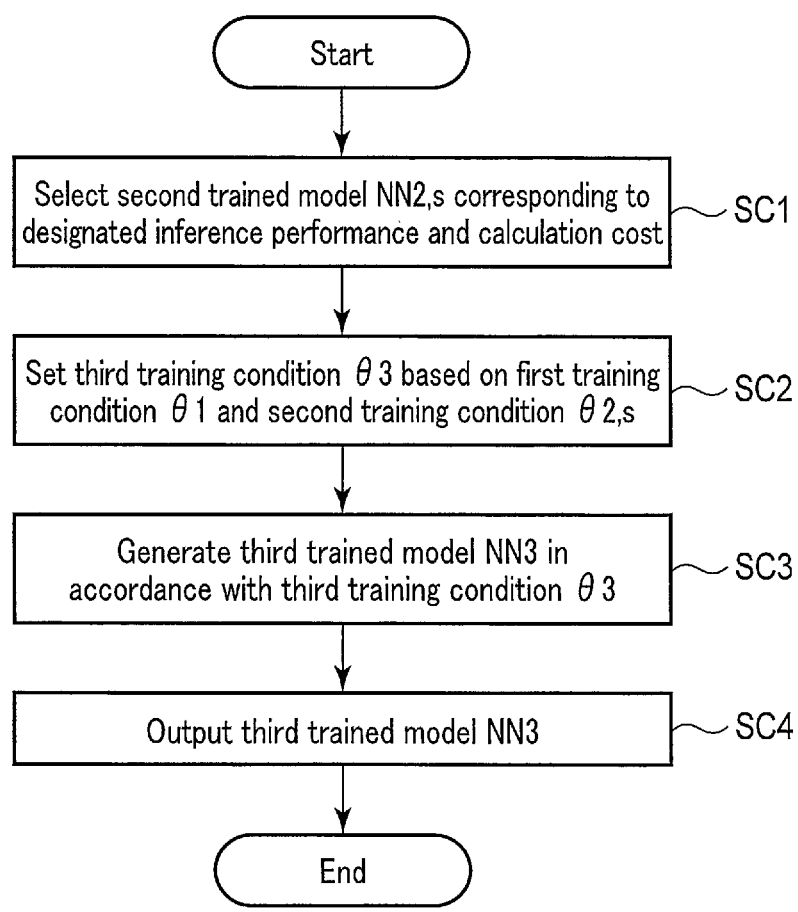
FIG. 11 shows an example of the flow of model optimization processing by processing circuitry according to the second embodiment.

FIG. 11 shows an example of the flow of model optimization processing by the processing circuitry 1 according to the second embodiment. FIG. 11 shows the flow of the processing after an inference performance and calculation cost are designated in step SA6 in FIG. 2 or step SB8 in FIG. 7.

When an inference performance and calculation cost are designated in step SA6 or step SB8, the model selection unit 13 selects a second trained model NN2,s corresponding to the designated inference performance and calculation cost (step SC1). The processing in step SC1 is the same as that in step SA7 or step SB9. After step SC1, the condition resetting unit 16 sets a third training condition θ3 based on the first training condition θ1 relating to the first trained model NN1 and the second training condition θ2,s relating to the second trained model NN2,s selected in step SC1 (step SC2). After step SC2, the model retraining unit 17 generates a third trained model NN3 based on the third training condition θ3 set in step SC2 (step SC3). In step SC3, the model retraining unit 17 trains a neural network in accordance with the third training condition θ3, and generates a third trained model NN3.

Here, the method of setting the third training condition θ3 and the method of generating the third trained model NN3 will be described in detail. The first training condition θ1 is set to a value that prioritizes improvement in the inference performance, and the second training conditions θ2,1 to θ2,K are each set to a value that prioritizes improvement in the calculation cost. The retraining is performed to improve the inference performance. The training setting condition, such as a loss function condition, a regularization function condition, an optimizer condition, and/or the like, is a setting condition that influences the inference performance, but the training setting condition relating to the second training condition may be set to a value that prioritizes calculation cost at the expense of inference performance.

Therefore, the condition resetting unit 16 sets a training setting condition P3 of the third training condition θ3 by changing the training setting condition P2,s, such as a loss function condition, a regularization function condition, an optimizer condition, and/or the like, of the second training condition θ2,s based on the training setting condition P1 of the first training condition θ1. For example, the third training setting condition P3 may be set at a weighted sum $P2=(1-w) \cdot P2,s + w \cdot P1$ of the first training setting condition P1 and the second training setting condition P2,s. Here, w is a weight that takes a value in the range of $0 \geq w \leq 1$, and is set to a value closer to 1 as the importance of the inference performance increases and to a value closer to 0 as the importance of the calculation cost increases. The weight w can be set for each of the loss function condition, regularization function condition, and optimizer condition. The weight w may be automatically set or discretionarily set by the user through the input interface 3.

The third training condition θ3 may be set independently from the first training condition θ1 and the second training condition θ2,s. For example, even when stochastic gradient descent is not adopted as the optimizer condition of the first training condition θ1 or second training condition θ2,s, stochastic gradient descent may be used as the optimizer condition of the third training condition θ3.

The third trained model NN3 may be generated by distillation. For example, the condition resetting unit 16 may set, as a soft target, the output data of the first trained model NN1 output in response to input data of training data. The model retraining unit 17 trains a neural network based on the set soft target, and generates a third trained model NN3. Specifically, the model retraining unit 17 trains a neural network by supervised learning based on input data and a soft target in accordance with the third training condition θ3. At this time, the model retraining unit 17 may train the neural network using truth data (a hard target) in addition to the input data and soft target. The third training condition θ3 may be set at the same value as the first training condition θ1, or may be set at a weighted sum of the first training condition θ1 and the second training condition θ2,s.

As another example of distillation, the condition resetting unit 16 may set, as a soft target, the output data of the second trained model NN2,s output in response to input data. Also in this case, the model retraining unit 17 trains a neural network based on the set soft target, and generates a third trained model NN3. The third training condition θ3 may be set at the same value as the second training condition θ2,s, or may be set at a weighted sum of the first training condition θ1 and the second training condition θ2,s.

As another example of distillation, the condition resetting unit 16 may set, as a soft target, an ensemble based on K outputs of K second trained models NN2,1 to NN2,K output in response to input. The condition resetting unit 16 calculates statistic data such as average value data or intermediate value data of K outputs, and sets the calculated statistic data as an ensemble. The ensemble may be based on the K outputs generated in the parallel training described as the first example in the first embodiment, or may be based on the K outputs generated in the sequential training described as the second example in the first embodiment. The condition resetting unit 16 may calculate the ensemble based on all of the K outputs, or may calculate the ensemble based on specific outputs of the K outputs. The specific outputs each may be an output having an interference performances and/or calculation cost whose deviation amount from the interference performances and/or calculation cost of the second training condition θ2,s is smaller than or equal to a threshold. The model retraining unit 17 trains a neural network based on the set soft target, and generates a third trained model NN3. The third training condition θ3 may be set at the same value as the second training condition θ2,s, or may be set at a weighted sum of the first training condition θ1 and the second training condition θ2,s.

After step SC3, the model output unit 14 outputs the third trained model NN3 generated in step SC3 (step SC4).

The model optimization processing according to the second embodiment accordingly finishes.

The model optimization processing according to the second embodiment may be modified as appropriate. For example, in step SC4, the model output unit 14 may output a trained model designated by the user through the input device 3 or the like among the second trained model NN2,s selected in step SC1 and the third trained model NN3 generated in step SC3. For example, in step SC4, the display controller 15 causes the inference performance and calculation cost of the second trained model NN2,s selected in step SC1 and those of the third trained model NN3 generated in step SC3 to be displayed as a graph or numerical values. The user compares the displayed inference performances and calculation costs, determines a trained model that satisfy the user's requirement, and designates the determined model through the input device 3. When a trained model is designated, the model output unit 14 outputs the designated trained model.

As described above, according to the second embodiment, the model retraining unit 17 performs retraining in accordance with the second training condition θ2,s of the second trained model NN2,s selected by the model selection unit 13. Through the retraining, it is expected to generate a third trained model NN3 having an improved inference performance in comparison with the second trained model NN2,s, and to generate a trained model NN3 closer to the user's requirement than the second trained model NN2,s.

Modification

Processing circuitry 1 according to a modification may set a third training condition corresponding to any inference performance and calculation cost designated by the user, and generate a third trained mode in accordance with the set third training condition. Hereinafter, the modification will be described. In the following description, structural elements having approximately the same functions as those in the above embodiments will be assigned with the same reference symbols as those in the above embodiments, and repetitive descriptions will be given only where necessary.

First, the model training unit 12 generates K second trained models by the parallel training processing of the first example or the sequential training processing of the second example, and calculates the inference performance and calculation cost of each second trained model. The number K of the second trained models to be generated may be smaller than that in the first example or second example. Next, the display controller 15 causes a graph of K inference performances and calculation costs to be displayed. Here, the display controller 15 calculates an approximate curve that estimates an inference performance and calculation cost relating to any point based on the inference performances and calculation costs relating to the first trained model and K second trained models, and causes the calculated approximate curve to be plotted in the graph. Since the inference performance and calculation cost are variables depending on the regularization strength, the approximate curve is calculated as a function having the regularization strength as a variable. For example, the approximate curve may be calculated as a quadratic or higher-degree multi-degree function, such as a spline curve based on the data point of an inference performance and calculation cost relating to each of the first rained model and K second trained models.

FIG. 12 shows a display example of the approximate curve of accuracy and model size. As shown in FIG. 12, the graph shows data points of the first trained model and K second trained models and an approximate curve. The approximate curve is displayed as a graphical user interface in such a manner that any point of the approximate curve can be designed by the user through the input device 3. The user designates a point representing a desired inference performance and calculation cost on the approximate curve. A point deviated from the approximate curve may be designated.

The condition resetting unit 16 sets a third training condition θ3 as a training condition for realizing the inference performance and calculation cost of the designated point. For example, the condition resetting unit 16 calculates an L2 regularization strength corresponding to the inference performance and calculation cost of the designated point, and sets the calculated L2 regularization strength as a parameter of the third training condition θ3. The other parameters of the third training conditions θ3 may be the same as or different from those of the k-th second training condition θ2,s which have already been set. The model retraining unit 17 trains a neural network in accordance with the set third training condition θ3 and generates a third trained model NN3. The third trained model NN3 is expected to have an inference performance and calculation cost corresponding to the point designated by the user.

According to the above modification, a third trained model NN3 corresponding to the inference performance and calculation cost desired by the user is expected to be generated. Since a third trained model NN3 corresponding to the designated inference performance and calculation cost can be output, a trained model having an inference performance and calculation cost not very different from the inference performance and calculation assumed by the user can be obtained.

The function of each unit according to the present embodiment, and the program for causing a computer to implement the function may be stored in a non-transitory computer readable medium.

Accordingly, the present embodiment enables a user to easily find a neural network that meets the user's requirement.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A learning apparatus comprising:
processing circuitry configured to:
set one or more second training conditions based on a first training condition relating to a first trained model, and
train one or more neural networks in accordance with the one or more second training conditions, and generate one or more second trained models which execute a task identical to a task executed by the first trained model; and
a display configured to display a graph showing an inference performance and calculation cost of each of the one or more second trained models,
wherein the processing circuitry is further configured to:
select a second trained model having an inference performance and/or calculation cost corresponding to an inference performance and/or calculation cost designated by a user through the graph among the one or more second trained models;

set a third training condition based on the first training condition and the second training condition relating to the selected second trained model;
train a neural network in accordance with the third training condition and generate a third trained model; and
output the third trained model.

2. The learning apparatus according to claim 1, wherein the processing circuitry is further configured to output the selected second trained model.

3. The learning apparatus according to claim 1, wherein the processing circuitry is further configured to set a training setting condition of the third training condition by changing a training setting condition, which includes a loss function condition, a regularization function condition, and/or an optimizer condition, of the second training condition based on a training setting condition of the first training condition.

4. The learning apparatus according to claim 1, wherein the third training condition includes a soft target, and the processing circuitry is further configured to:
set, as the soft target, an ensemble based on an output of the first trained model in response to input data of training data, an output of the selected second trained model, or one or more outputs of the one or more second trained models, and
train a neural network based on the soft target and generate the third trained model.

5. The learning apparatus according to claim 1, wherein the processing circuitry is further configured to set one or more second regularization strengths of the one or more second training conditions based on a first regularization strength of the first training condition, the one or more second regularization strengths having different values.

6. The learning apparatus according to claim 5, wherein the processing circuitry is further configured to set the one or more second regularization strengths within a range delimited by an upper limit value and a lower limit value.

7. The learning apparatus according to claim 5, wherein the processing circuitry is further configured to set the one or more second regularization strengths based on the first regularization strength or a preceding second regularization strength.

8. The learning apparatus according to claim 1, wherein the one or more second trained models are a plurality of second trained models, and
the processing circuitry is further configured to generate the second trained models by parallel training.

9. The learning apparatus according to claim 1, wherein the one or more second trained models are a plurality of second trained models, and
the processing circuitry is further configured to generate the second trained models by sequential training.

10. The learning apparatus according to claim 1, wherein the display displays the graph, in which a plurality of data points representing inference performances and calculation costs of the first trained model and the one or more second trained models are plotted.

11. The learning apparatus according to claim 10, wherein the display displays the graph, in which an approximate curve of inference performances and calculation costs based on the data points is plotted.

12. The learning apparatus according to claim 10, wherein for a data point designated by a user among the data points, the display displays a number of channels of each of layers of the first trained model and a second trained model corresponding to the data point designated by the user.

13. The learning apparatus according to claim 1, wherein the one or more second training conditions includes a soft target, and the processing circuitry is further configured to:
set, as the soft target, an output of the first trained model output in response to input data of training data, and
train one or more neural networks based on the soft target and generate the one or more second trained models.

14. The learning apparatus according to claim 1, wherein the calculation cost is a number of parameters, a number of multiplications, a number of channels, an inference speed, a power consumption, a memory capacity, a memory bandwidth, and/or a latency.

15. The learning apparatus according to claim 1, wherein the processing circuitry is further configured to:
train one or more neural networks in accordance with the one or more second training conditions and generate one or more trained neural networks, and
generate the one or more second trained models by deleting a trainable parameter having a contribution ratio below a threshold from the one or more trained neural networks.

16. The learning apparatus according to claim 1, wherein the processing circuitry is further configured to output a third trained model corresponding to an inference performance and/or calculation cost designated by a user through the graph.

17. A training method comprising:
setting one or more second training conditions based on a first training condition relating to a first trained model;
training one or more neural networks in accordance with the one or more second training conditions and generating one or more second trained models which execute a task identical to a task executed by the first trained model; and
displaying a graph showing an inference performance and calculation cost of each of the one or more second trained models,
wherein the training method further comprises:
selecting a second trained model having an inference performance and/or calculation cost corresponding to an inference performance and/or calculation cost designated by a user through the graph among the one or more second trained models;
setting a third training condition based on the first training condition and the second training condition relating to the selected second trained model;
training a neural network in accordance with the third training condition and generating a third trained model;
outputting the third trained model.

18. A non-transitory computer readable medium including computer executable instructions, wherein the instructions, when executed by a processor, cause the processor to perform operations comprising:
setting one or more second training conditions based on a first training condition relating to a first trained model;
training one or more neural networks in accordance with the one or more second training conditions and generating one or more second trained models which execute a task identical to a task executed by the first trained model; and
displaying a graph showing an inference performance and calculation cost of each of the one or more second trained models,
wherein the operations further comprise:
selecting a second trained model having an inference performance and/or calculation cost corresponding to an inference performance and/or calculation cost designated by a user through the graph among the one or more second trained models;

setting a third training condition based on the first training condition and the second training condition relating to the selected second trained model;

training a neural network in accordance with the third training condition and generating a third trained model; and outputting the third trained model.

* * * * *